Sept. 9, 1958         S. A. HADDAD         2,851,655
AMPEROMETRIC CONTINUOUS MEASUREMENT SYSTEM
Filed Sept. 25, 1956
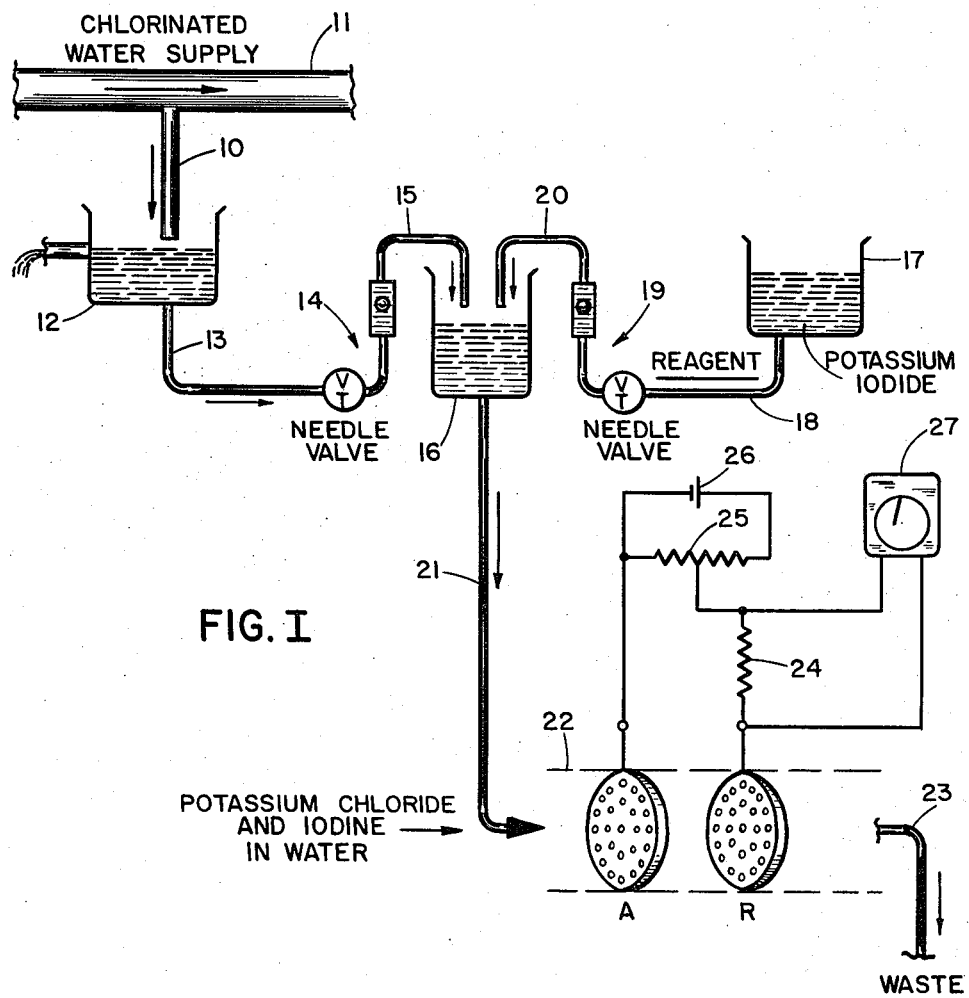
FIG. I
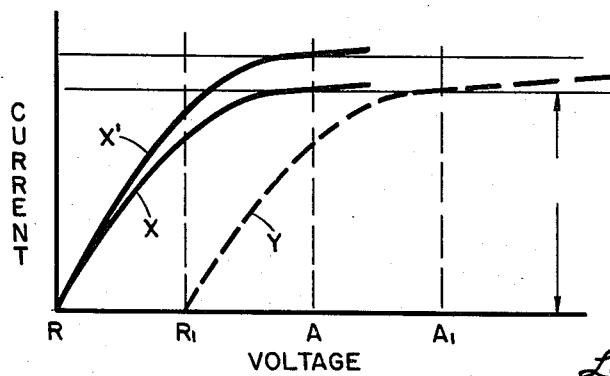
FIG. II
INVENTOR.
SAMIR A. HADDAD
BY
Lawrence H. Poeton
AGENT

United States Patent Office 2,851,655
Patented Sept. 9, 1958

2,851,655

AMPEROMETRIC CONTINUOUS MEASUREMENT SYSTEM

Samir A. Haddad, Manville, R. I., assignor to The Foxboro Company, Foxboro, Mass., a corporation of Massachusetts Application September 25, 1956, Serial No. 611,934

2 Claims. (Cl. 324—30)

This invention relates to electrochemical measurements wherein electrodes are used in a liquid, and has particular reference to the measurement of electrical current in a circuit which includes a liquid path between such electrodes.

Various amperometric devices in electrochemical measurement systems have been used in the past but none have been fully satisfactory and none have provided, on a practical basis, for the continuous measurement of the concentration of a particular component in a liquid, especially under conditions of potentiometric changes in the liquid solution which is being measured.

The system of this invention may be used to measure residual chlorine in water supplies in terms of such chlorine as translated into iodine for measurement purposes, or for the measurement of other similarly suitable electrolytically decomposable components.

This invention provides a new and useful system for the continuous measurement of the concentration of a preselected component of a liquid solution by continuously flowing the liquid under measure through a conduit wherein a pair of electrodes are fixedly mounted in spaced relation along said conduit. The electrodes are closely similar as to material, size, and shape, and are mounted transversely of the conduit so that the flowing liquid under measure must pass through the electrodes. The electrodes are formed with numerous uniformly spaced perforations therethrough for this purpose. An example of suitable material for such electrodes is platinum. Both electrodes may be of platinum or one may be of platinum and the other of gold or they may be of materials in any combination wherein, because of the selected materials, the electrodes are both, and similarly, subject to change with respect to potential upon the occurrence of potentiometric changes such as pH changes in the flowing solution under measure. Accordingly, the two electrode combination of this invention provides electrode potential solution equilibrium with respect to potentiometric changes in the solution. The fixed potential nature of such prior art devices as calomel, silver, or silver chloride electrodes and the like make them unsuitable for use in the device of this invention, and systems using such prior art electrodes require some other means of identifying and compensating for potentiometric changes such as pH in the solution under measure. On the other hand, the system of this invention automatically compensates for such potentiometric changes.

It therefore, is an object of this invention to provide a new and improved amperometric measurement system.

Other objects and advantages of this invention will be in part apparent and in part pointed out hereinafter and in the accompanying drawing, wherein:

Figure I is a schematic showing of an illustrative embodiment of this invention in the form of a residual chlorine concentration measurement with respect to a water solution, wherein the electrolytically unstable chlorine is associated with potassium iodide to provide electrolytically stable iodine in a water solution for concentration measurement in representation of the chlorine concentration; and Figure II is an amperometric curve illustration with respect to the measurement of iodine (i. e., chlorine) concentration wherein the effect of a potentiometric change such as pH in the liquid under measure, is illustrated.

Figure I illustrates the application of an embodiment of this invention to the measurement of chlorine concentration in a water solution.

A chlorinated water sample take-off pipe 10 is connected to a chlorinated water supply pipe 11 as a means of feeding a sample supply to a sample tank 12 which is allowed to at least slightly overflow constantly as a means of maintaining a constant head of sample water supply. From the water tank 12 an outlet pipe 13 carries the sample water through a conventional needle valve and ball float system 14 for maintaining a constant flow in the chlorinated water supply and an output pipe 15 from the ball float unit feeds the chlorinated water into a mixing container 16. On the other hand a reagent supply of potassium iodide solution is provided in a tank 17. The outlet of this tank is a pipe 18 leading to a second conventional flow controlling needle valve and ball float unit 19 with a ball float outlet pipe 20 carrying the reagent into the mixing container 16 so that the chlorinated water and the potassium iodide are joined in the mixing container 16 to form a water solution of potassium chloride and iodine. The resultant potassium chloride, as well as any excess potassium iodide, is inert and will not decompose under the electrochemical conditions of this device so that the remaining component of iodine is therefore measurable as to concentration in representation of the chlorine concentration in the water supply being tested.

From the mixing tank 16 the water solution of potassium chloride, iodine and excess potassium iodide, if any, is carried away by a pipe 21 to a measuring conduit 22 wherein a pair of electrodes R and A are located. The iodine solution thereafter flows to waste as indicated at 23 or it may be salvaged as a means of reclaiming the component thereof in any suitable conventional manner (not shown).

In the Figure I system, electrode R is a reference electrode, ordinarily established at essentially zero potential, and electrode A is an indicator electrode, established at a potential, with respect to the reference electrode potential, which is sufficient to establish a potential range capable of encompassing the polarization current curve of the particular component being measured.

The electrodes R and A are mounted in fixed relation within the conduit 22 and transversely perpendicular thereto. These electrodes are in the form of perforated discs with the perforations substantial in number and uniformly spaced throughout the sample flow facing faces of the electrode discs. The sample solution thus flows through both discs which by their spaced apart relation along the length of the measuring conduit 22 make it possible for the sample solution to act as an electrical conductor in the provision of a current path between the electrodes R and A. The diffusion layer forms not on the reference electrode R but on the indicator electrode A. It is desirable for this diffusion layer to be quite thin for quick response in the operation of this system and this is accomplished by providing a sufficient flow of sample liquid to actually physically tear down the diffusion layer to a desired thinness. However, the diffusion layer must be effectively uniform as to thinness throughout the surface of the electrode which is exposed to the sample flow. For this reason the electrode is formed as a screen.

Thus small unit area face portions thereof are presented to the sample flow and thus the flow is past a substantial number of small, uniformly arranged electrode areas. Each such area thus gets essentially the same flow application and for practical purposes the combination of the rate of formation of diffusion layer and the rate of sample flow, maintain a thin diffusion layer which is essentially uniform throughout the entire flow meeting face of the electrode.

The electrodes R and A, and when a device is in operation, the iodine solution therebetween, form a part of an electrochemical measuring circuit which includes a fixed resistor 24 and a variable resistor 25 in series between the electrodes R and A. This circuit is energized from a direct current source such as battery 26 and the measurement of the current in the circuit in taken, for example, across the resistor 24 as a voltage drop, by a suitable conventional measuring instrument 27.

The functioning of the system according to this invention is illustrated by the voltage-current curve showing of Figure II. The potentials assigned and applied to the electrodes R and A in Figure I through the arrangement of their associated circuit and particularly through adjustment of the variable resistor 25, are important in that according to preselection and preknowledge under a given set of electrochemical conditions the polarizing curve of a particular composition component such as iodine would be initiated as to substantial current increase at one potential and would terminate as to substantial current increase at another potential which is essentially the beginning of the limiting current plateau of such a curve. The amplitude variation of the polarizing curve such as that indicated by X in Figure II is determined by the concentration of the component which is being measured. Whatever the concentration and consequent amplitude of the curve such as curve X, the full curve nevertheless for a particular composition will fall within a potential range extending between the two electrode potential values which are preselected according to prior knowledge, at least in approximation. Thus in Figure II curve X represents one value of concentration of chlorine and curve X' represents a greater concentration value of chlorine. Note that in both cases the full curve lies between the electrode potentials indicated in curve Figure II as R and A. This is the measuring operation which continues in this fashion with varying amplitude as long as there is no change in the potentiometric conditions of the chlorine solution. This means of course, the iodine solution as is actually measured. However, under conditions of potentiometric change it is important that the polarizing curve still remains within the range of potential which lies between the potentials of the two electrodes. It is a substantial advantage of this invention that when a potentiometric change occurs in the solution being measured, the potentials which have been assigned to each of the two electrodes are both automatically changed. This is because of the nature of the material of the electrodes which have been selected and of the similarity of the electrodes from electrochemical and form and dimension standpoints. Thus as in Figure II curve Y represents the polarizing curve of the same concentration as that indicated in curve X except that curve Y represents the situation wherein a potentiometric change has occurred in the solution under measure, for example, a pH change has occurred. Thus the potentials of the electrodes R and A now become new potentials at R' and A' and the potential range or span between electrodes R and A is essentially tehe same as that new span between electrodes R' and A'. For this reason, the measurement of the amplitude of the curve Y produces the same result as the measurement of the amplitude of the curve X, that is, an automatic compensation of potentiometric change in the solution has been carried out. Without such automatic compensation, as would occur with prior art devices, the range of polarity between the electrodes would not properly span the polarizing curve after a potentiometric change in the solution. For example, the potential at the electrode A might then fall, under such prior art conditions, at a point on the polarizing curve prior to the full peak of amplitude of that curve or substantially after the beginning of the limiting current plateau of that curve or potential of the electrode R might well no longer be coincident with the potential at which the polarizing curve starts to rapidly rise. Thus in order to properly match up the electrode potentials with the polarizing curve it is necessary to have the automatic potentiometric change compensation of this invention.

This invention, therefore, provides a new and improved electrochemical measurement device wherein amperometric measurements are made with a two electrode system wherein the relative potential relationship between the electrodes is essentially maintained in an automatic compensation action with respect to potentiometric changes in the liquid solution being measured. This device may be described as a fixed applied potential system with an operational potential adjustment in compensation for potentiometric changes such as pH changes in the liquid solution being measured.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

1. An amperometric measurement system for continuously determining the concentration of a preselected component of a flowing liquid and for continuously compensating for potentiometric changes in said flowing liquid, wherein an electrical current is measured in relation to pre-established potentials on a pair of metallic electrodes in said flowing liquid, and wherein said continuous compensation maintains an effectively fixed differential between said potentials to provide the effect of electrical current measurement with respect to fixed potentials on said electrodes, said system comprising, in combination, a conduit for carrying said flowing liquid, a fixed volume measurement unit formed of a length of said conduit with conduit filling end walls in the form of said pair of metallic electrodes, said pair of electrodes being fixedly mounted in said conduit and thus in spaced relation with each other lengthwise of said conduit, said electrodes being characterized in that they are perforated discs essentially identical in shape and essentially equal in size, and with said perforations in the form of identical, multiple, uniformly spaced screen openings, in that they are mounted completely stationary in and transversely at right angles to said conduit, whereby said flowing liquid meets and passes through said electrodes essentially at right angles thereto and because of said stationary right angled mounting and said multiple openings, only a thin, evenly distributed diffusion layer is maintained on one of said electrodes, in that the materials of said electrodes are preselected as subject to change with respect to electrical potential thereon upon the occurrence of potentiometric changes in said flowing liquid, and in that said change characteristics are at least similar so as to provide, in combination with said identical shape, equal size, and identical openings, the result that over a preselected range, an electrical potential difference between said electrodes remains effectively unchanged upon said occurrence of said potentiometric changes, thus providing said automatic compensation for said potentiometric changes, a direct current electrical measurement circuit including said electrodes and the said flowing liquid therebetween, a direct current source, means including electrical resistance means for applying different electrical potentials to said electrodes from said direct current source with said electrode potentials preselected, and applied by adjustment of said resistance means, with reference to the amperometric characteristics and curves of said preselected component in that for a given electrochemical set of conditions the polarizing current curve of said preselected component lies in the electrical potential range between said preselected electrode potentials as represented by said fixed potential differential, and means for measuring the concentration of said preselected component in terms of fixed potential drop electrical current through said circuit, as varied only by changes in said concentration of said preselected component in said flowing liquid.

2. An amperometric measurement system for continuously determining the concentration of residual chlorine in water in a situation wherein chlorinated water is mixed with potassium iodide as a reactant to produce a flowing water solution of potassium chloride and iodine, with said measurement system applied to the measurement of the concentration of said iodine as representative of the concentration of said chlorine, for continuously compensating for pH changes in said flowing liquid, wherein an electrical current is measured in relation to pre-established potentials on a pair of platinum electrodes in said flowing liquid, and wherein said continuous compensation maintains an effectively fixed differential between said potentials to provide the effect of electrical current measurement with respect to fixed potentials on said electrodes, said system comprising, in combination, a conduit for carrying said flowing liquid, a fixed volume measurement unit formed of a length of said conduit with conduit filling end walls in the form of said pair of platinum electrodes, said pair of electrodes being fixedly mounted in said conduit and thus in spaced relation with each other lengthwise of said conduit, said electrodes being characterized in that they are perforated discs essentially identical in shape and essentially equal in size, and with said perforations in the form of identical, multiple, uniformly spaced screen openings, in that they are mounted completely stationary in and transversely at right angles to said conduit, whereby said flowing solution meets and passes through said electrodes essentially at right angles thereto and because of said stationary right angled mounting and said multiple openings, only a thin, evenly distributed diffusion layer is maintained on one of said electrodes, in that said platinum material of said electrodes is subject to change with respect to electrical potential thereon upon the occurrence of pH changes in said flowing solution, and in that said change characteristics are essentially identical so as to provide, in combination with said identical shape, equal size, and identical openings, the result that over a preselected range, an electrical potential difference between said electrodes remains effectively unchanged upon said occurrence of said pH changes, thus providing said automatic compensation for said pH changes, a direct current electrical measurement circuit including said electrodes and the said fixed volume of flowing liquid therebetween, a direct current source, means including electrical resistance means for applying different electrical potentials to said electrodes from said direct current source with said electrode potentials preselected, and applied by adjustment of said resistance means, with reference to the amperometric characteristics and curves of said residual chlorine in that for a given electrochemical set of conditions the polarizing curve of said residual chlorine lies in the electrical potential range between said preselected electrode potentials as represented by said fixed potential differential, and means for measuring the concentration of said residual chlorine in terms of fixed potential drop electrical current through said circuit, as varied only by changes in said concentration of said residual chlorine in said flowing solution.

References Cited in the file of this patent

UNITED STATES PATENTS

| | | |
|---|---|---|
| 1,217,365 | Talley | Feb. 27, 1917 |
| 2,122,364 | Christie | June 28, 1938 |
| 2,289,687 | Stuart | July 14, 1942 |
| 2,350,378 | Wallace | June 6, 1944 |
| 2,615,839 | Willier | Oct. 28, 1952 |